(12) United States Patent  
Nijs

(10) Patent No.: US 11,911,926 B2
(45) Date of Patent: Feb. 27, 2024

(54) LINK ELEMENTS FOR IMPROVED FLEXIBLE ABRASIVE CUTTING TOOLS

(71) Applicant: HUSQVARNA AB, Huskvarna (SE)

(72) Inventor: Tristan Nijs, Hoves (BE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/286,038

(22) PCT Filed: Oct. 14, 2019

(86) PCT No.: PCT/SE2019/051003
§ 371 (c)(1),
(2) Date: Apr. 16, 2021

(87) PCT Pub. No.: WO2020/085973
PCT Pub. Date: Apr. 30, 2020

(65) Prior Publication Data
US 2021/0379790 A1    Dec. 9, 2021

(30) Foreign Application Priority Data
Oct. 22, 2018    (SE) .................................... 1851303-6

(51) Int. Cl.
*B27B 33/14* (2006.01)
*B28D 1/08* (2006.01)

(52) U.S. Cl.
CPC ............ *B27B 33/144* (2013.01); *B28D 1/082* (2013.01); *Y10T 83/909* (2015.04)

(58) Field of Classification Search
CPC ..... B27B 33/14; B27B 33/141; B27B 33/253; Y10T 83/909; Y10T 83/925;
(Continued)

(56) References Cited
U.S. PATENT DOCUMENTS 1,150,218 A * 8/1915 Martin .................. B27B 33/142
83/833
1,178,362 A * 4/1916 Wall ...................... B27B 33/148
83/831
(Continued)

FOREIGN PATENT DOCUMENTS

CA    2597274 A1    2/2008
JP    66114901 A    1/1986
(Continued)

OTHER PUBLICATIONS

International Search Report and Written Opinion for International Application No. PCT/SE2019/051003 dated Jan. 29, 2020.
(Continued)

*Primary Examiner* — Laura M Lee
(74) *Attorney, Agent, or Firm* — BURR & FORMAN LLP

(57) ABSTRACT

An element for serial configuration with an adjacent element in an abrasive tool, wherein the element is arranged to be mounted on a flexible drive carrier having a drive direction D. The element comprising at least one protruding member extending in a direction parallel to the drive direction D. The at least one protruding member being configured to overlap with the adjacent element at least when the flexible drive carrier has a straight configuration, and to reduce a width of a gap G formed between the element and the adjacent element when the flexible drive carrier is configured bent in an arcuate form.

18 Claims, 14 Drawing Sheets

(58) Field of Classification Search
CPC ..... Y10T 83/913; Y10T 83/917; B28D 1/124; B28D 1/082; B23D 61/185
USPC ........................................ 83/830; 125/21, 22
See application file for complete search history.

(56) References Cited

U.S. PATENT DOCUMENTS

| | | | | |
|---|---|---|---|---|
| 1,273,394 | A | | 7/1918 | Meyer |
| 1,412,315 | A | * | 4/1922 | Franklin ............... B27B 33/145 |
| | | | | 83/831 |
| 2,801,653 | A | * | 8/1957 | Van Wagner ........... B27B 33/14 |
| | | | | 83/831 |
| 2,869,534 | A | * | 1/1959 | Stihl ...................... B28D 1/124 |
| | | | | 125/21 |
| 2,912,968 | A | * | 11/1959 | Stihl ...................... B27B 33/145 |
| | | | | 125/21 |
| 3,053,130 | A | * | 9/1962 | Nitchie ................... B26D 3/14 |
| | | | | 83/326 |
| 3,945,288 | A | * | 3/1976 | Olmr ..................... B27B 33/141 |
| | | | | 83/834 |
| 4,089,561 | A | * | 5/1978 | Carden .................. E21C 25/28 |
| | | | | 125/21 |
| 4,269,100 | A | * | 5/1981 | Deelman ............... B27B 33/141 |
| | | | | 83/834 |
| 4,562,761 | A | * | 1/1986 | Alexander .............. B27B 17/02 |
| | | | | 83/830 |
| 5,184,598 | A | * | 2/1993 | Bell ...................... B27B 33/141 |
| | | | | 451/298 |
| 5,215,072 | A | * | 6/1993 | Scott ...................... B28D 1/124 |
| | | | | 125/21 |
| 5,791,330 | A | | 8/1998 | Tselesin |
| 6,021,826 | A | * | 2/2000 | Daniell ................... F16B 12/04 |
| | | | | 403/292 |
| D491,205 | S | * | 6/2004 | Bailey .......................... D15/139 |
| 8,960,178 | B2 | * | 2/2015 | Buchholtz ............... B27B 17/14 |
| | | | | 125/21 |
| 9,573,294 | B2 | * | 2/2017 | Buchholtz ............... B27B 33/14 |
| 2010/0005668 | A1 | | 1/2010 | Yancey et al. |
| 2015/0209976 | A1 | * | 7/2015 | Kim ........................ B28D 1/08 |
| | | | | 125/21 |
| 2017/0157798 | A1 | * | 6/2017 | Gerlach ................. B23D 61/18 |
| 2020/0316811 | A1 | * | 10/2020 | Hodgkinson ......... B27B 33/145 |

FOREIGN PATENT DOCUMENTS

| | | |
|---|---|---|
| JP | H05329832 A | 12/1993 |
| KR | 20130019118 A | 2/2013 |
| WO | 9852728 A2 | 11/1998 |
| WO | 2014080396 A1 | 5/2014 |
| WO | 2016139569 A1 | 9/2016 |

OTHER PUBLICATIONS

Office Action and Search Report for Swedish Application No. 1851303-6 dated May 28, 2019.

* cited by examiner

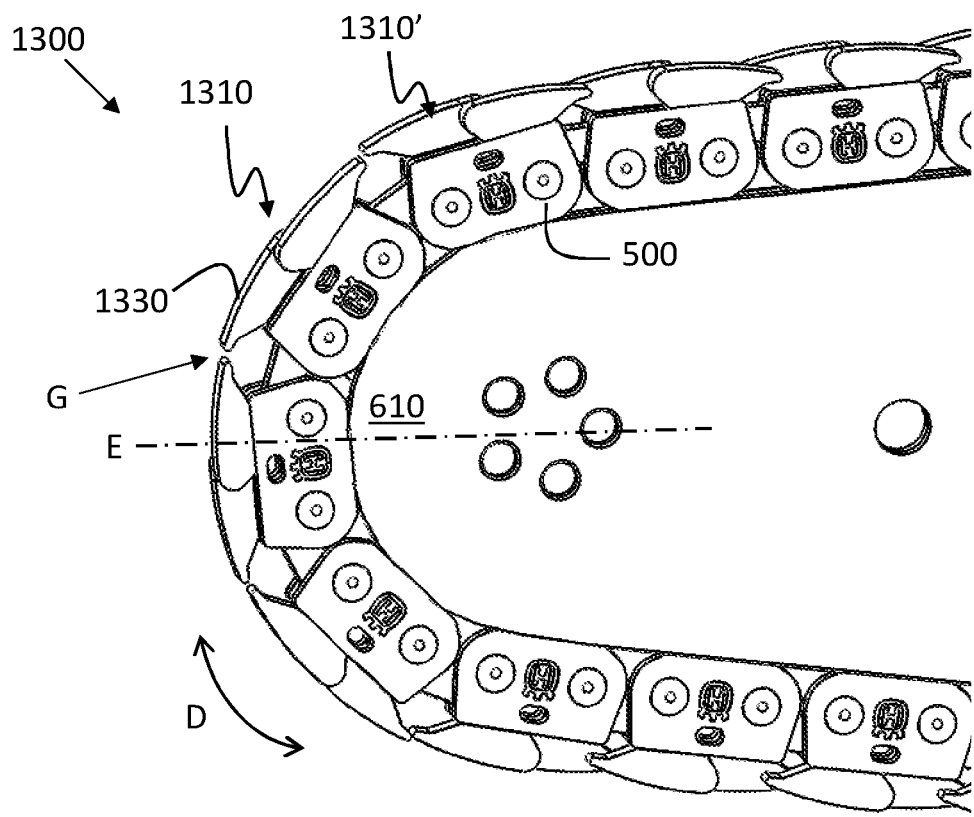
FIG. 13
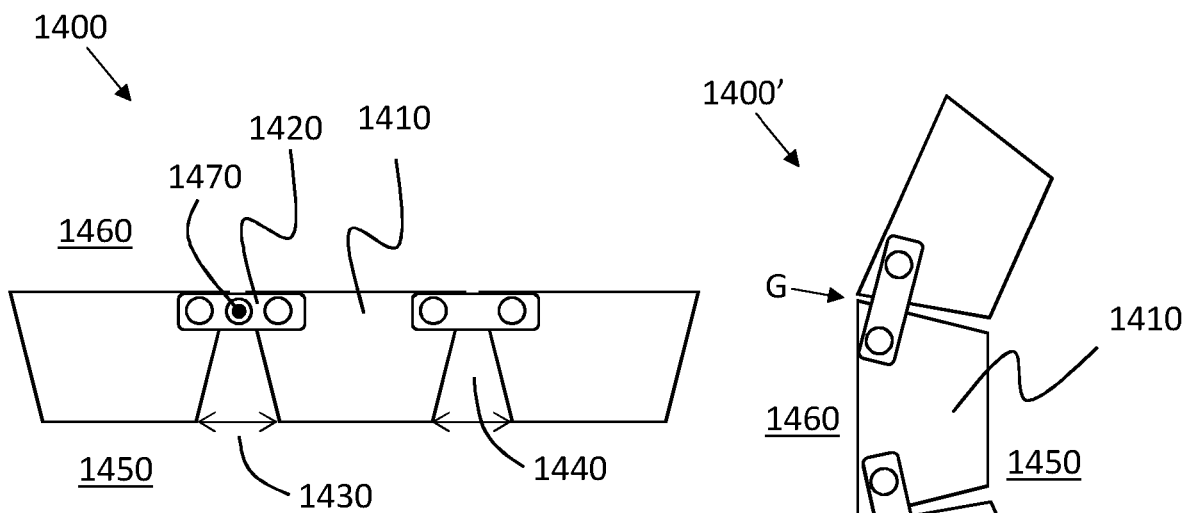
FIG. 14A
FIG. 14B

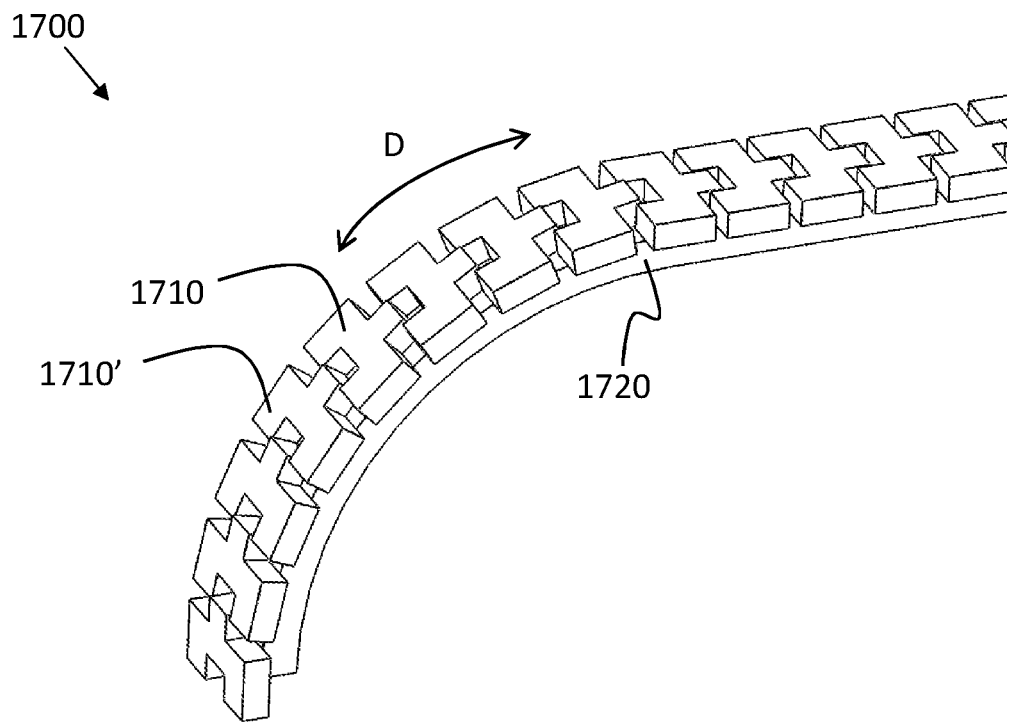
FIG. 17
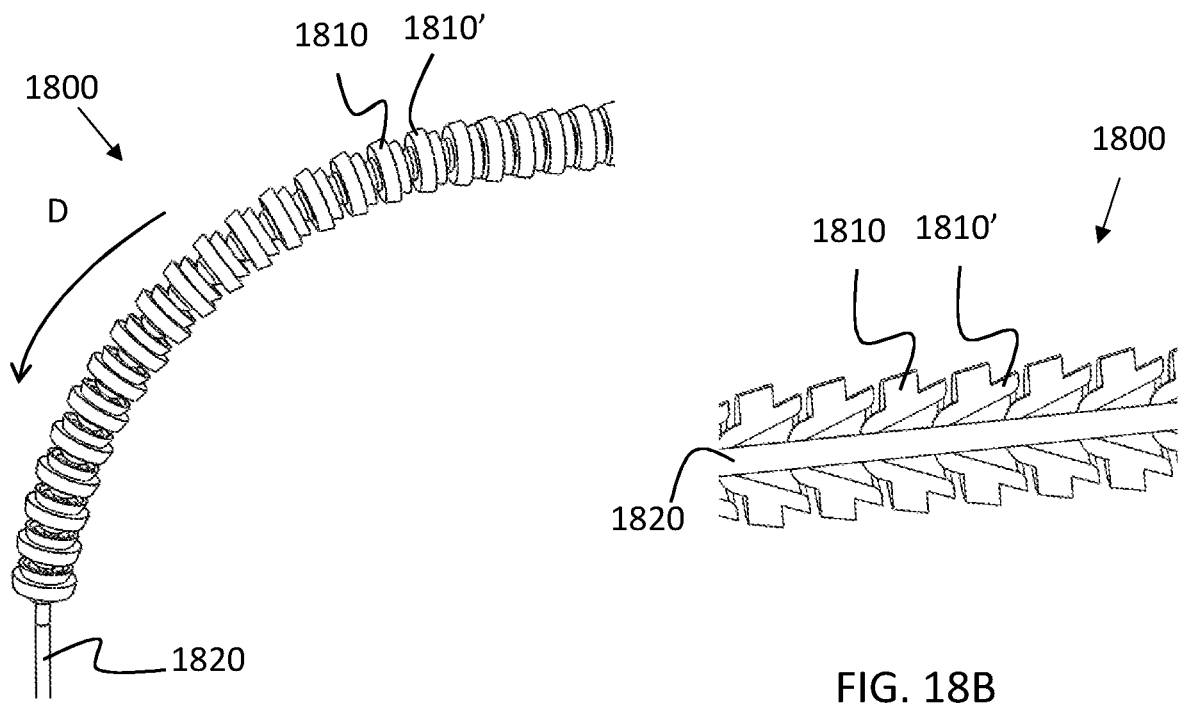
FIG. 18A
FIG. 18B

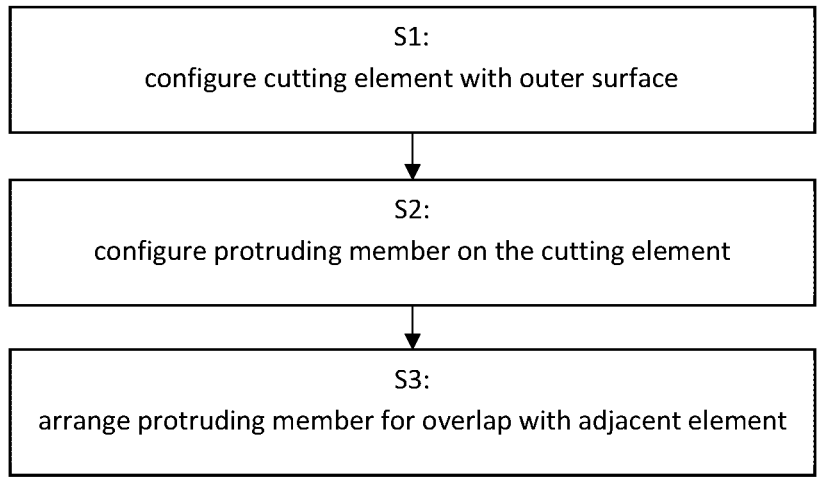
FIG. 19
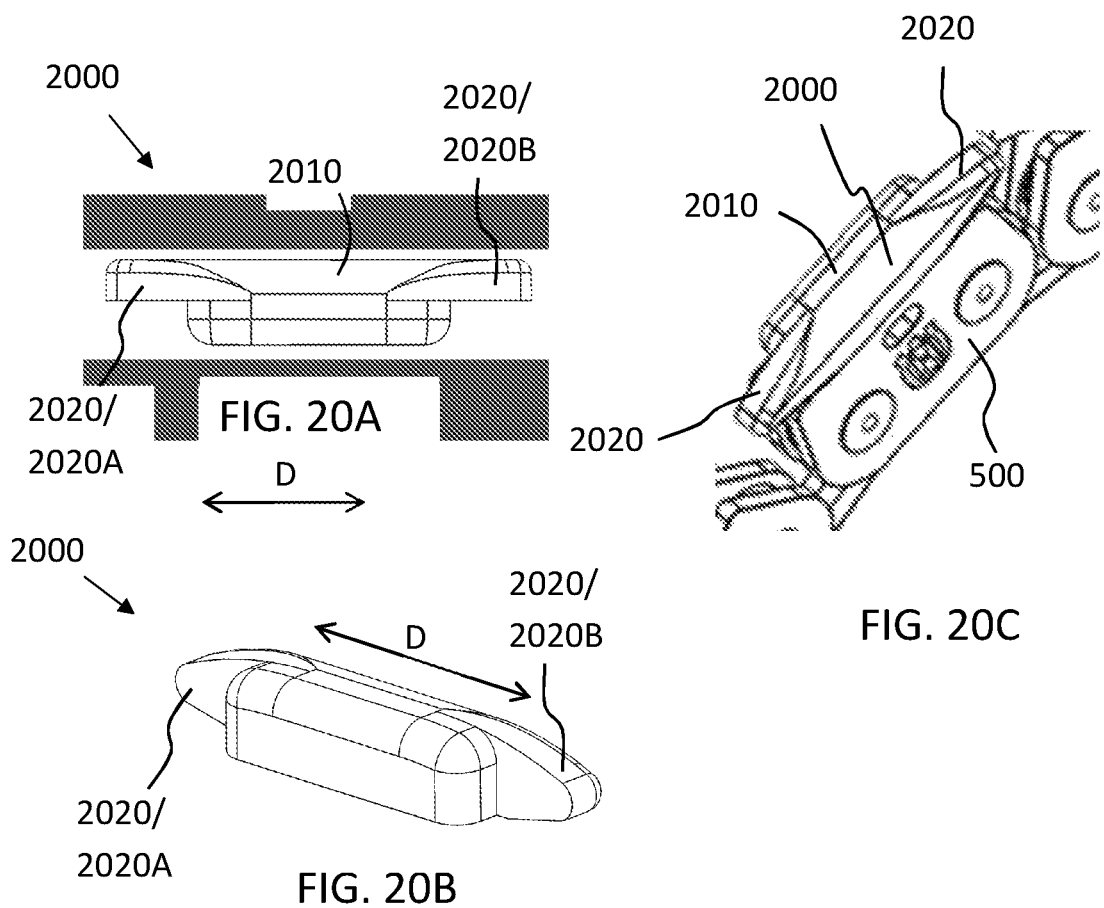
FIG. 20A
FIG. 20B
FIG. 20C

LINK ELEMENTS FOR IMPROVED FLEXIBLE ABRASIVE CUTTING TOOLS

TECHNICAL FIELD

The present disclosure relates to abrasive cutting tools for cutting hard materials such as concrete, steel, and stone. There are disclosed elements which can be arranged on a flexible drive carrier such as a chain, wire, or belt. The elements can be either abrasive elements or non-abrasive elements.

BACKGROUND

Diamond cutting chains can be used to cut into hard structures like concrete walls, pipes, and other structures. A cutting chain arrangement based on a flexible drive carrier offers advantages compared to fixed blades when it comes to plunging depth and portability; to reach the same cutting depth as a 16" chainsaw, an 800 mm diameter diamond blade or larger must be used.

Also, due to overcutting, large fixed sawblades are not able to produce straight corner cuts. Chainsaws and wire saws on the other hand are not associated with overcut problems. For instance, wall-saws comprising chain-saw adapters have been introduced to alleviate problems related to overcutting. Diamond cutting chains can be used on common portable chainsaws, which is an advantage.

Abrasive particle cutting chains, such as diamond cutting chains, are known. U.S. Pat. No. 5,215,072A discloses a saw chain for cutting hard abradable materials by means of a chain arranged with abrasive particles.

Tool wear is a problem associated with cutting tools for cutting into hard materials. The expected life-span of a cutting tool can be measured in inch-feet (in-ft), where an in-ft is defined as the depth of the cut in inches times the length of the cut in ft. The life-span of some diamond chain saws may be as low as 200 in-ft, which means that they must be replaced quite often. This drives cost and also adds overhead to construction time, which is a drawback There is a need for improved flexible cutting tools, such as cutting chains, having prolonged life-span.

Operator comfort and safety is always an important aspect which needs to be considered when selecting cutting tools. Kick-back refers to a situation when the cutting tool snags into the material which is cut, which causes the tool to kick back and potentially harm the operator. It is desired to minimize the risk of kick-back. Consequently, there is an ever-present need for cutting tools which reduce the risk of kick-back.

SUMMARY

It is an object of the present disclosure to provide elements, cutting tools, and methods which alleviate at least some of the problems mentioned above.

This object is at least in part obtained by an element for serial configuration with at least one adjacent element on or in an abrasive tool. The element is arranged to be mounted on a flexible drive carrier having a drive direction D. The element comprises at least one protruding member arranged extending in a direction parallel to the drive direction D. The at least one protruding member is configured to overlap with the adjacent element at least when the flexible drive carrier has a straight configuration, and to be in contact with a material to be cut by the abrasive cutting tool, thereby reducing a width of a gap G formed between the element and the adjacent element when the flexible drive carrier is configured bent in an arcuate form.

By means of the protruding members which overlap with adjacent elements, the gap G that forms between adjacent elements as the flexible drive carrier is bent is at least partly covered. This prevents the elements to impact the material to be cut, which results in several advantages; For instance, tool life is prolonged, operator comfort is increased, and cutting efficiency may also be increased.

As will be explained in detail below, the element can according to some aspects be a cutting element configured to include or hold an abrasive compound or material, and to perform an abrasive operation. The element can be a deported support attached to the drive carrier, but it can also be a part of the drive carrier itself such as a link or tie-strap.

The element can according to other aspects also be a non-abrasive element, such as a link element, a bumper element, or tie strap arranged on the abrasive tool. It is appreciated that abrasive and non-abrasive link elements having this type of protrusion may be arranged mixed or interleaved on a cutting tool. The overlapping adjacent elements or protruding members can be same, symmetrical or different in shape, having the same function or not (abrasive or non-abrasive).

According to some aspects, the cutting tool is an abrasive cutting chain for use with a chain saw.

The chain saw may be a regular chainsaw such as a chain saw used for cutting wood. This means that a tool can be cost efficiently composed. Using abrasive cutting chains also reduces or eliminates problems related to overcuts.

According to some such aspects, the element is arranged to be attached to a link in a cutting chain.

According to some other aspects, the flexible drive carrier is any of a belt or a wire.

Cutting tools based on belts and wires find other applications where a chain-based cutting tool may not be adequate. It is an advantage that the disclosed techniques find a wide variety of application areas.

According to aspects, the element constitutes a link in a cutting chain.

This is an alternative and/or complementary implementation compared to aspects where cutting elements are attached to chains. By having chain links with protruding members, gaps can be efficiently covered. Also, chain link elements other than those comprising abrasive compound can be used to cover gaps between adjacent elements, which is an advantage.

There are also disclosed herein construction equipment, cutting tools, bands, wires, chain saws, other power tools and methods associated with the above-mentioned advantages.

BRIEF DESCRIPTION OF THE DRAWINGS

The present disclosure will now be described in more detail with reference to the appended drawings, where FIGS. 1-2 schematically illustrate cutting tools according to prior art;

FIGS. 11-14 illustrate example cutting tools;

FIGS. 17-18 illustrate example cutting tools;

FIG. 19 is a flow chart illustrating methods; and

FIG. 20-23 show further example elements for flexible cutting tools;

DETAILED DESCRIPTION

Figure 1:
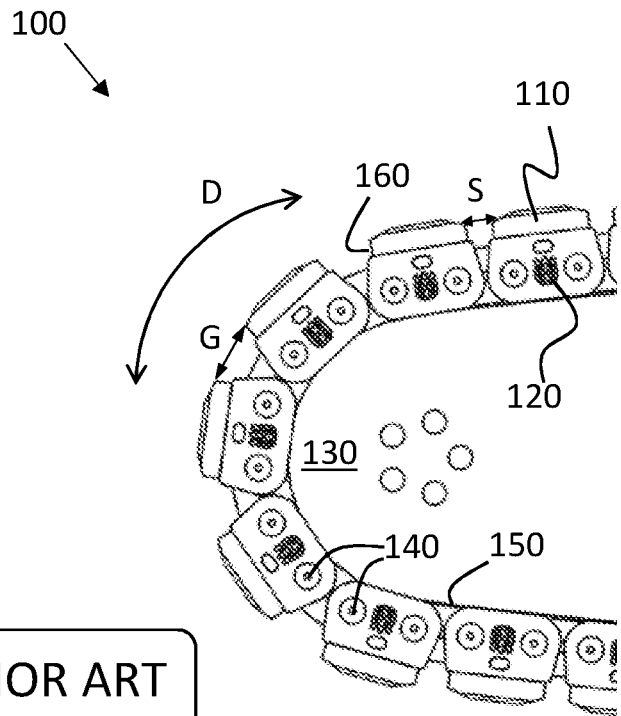

Aspects of the present disclosure will now be described more fully hereinafter with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Herein, a flexible drive carrier tool refers to a cutting tool where a plurality of abrasive elements, i.e., cutting elements, have been arranged on a flexible drive carrier which is driven by a power source such that the cutting elements abrade a material to be cut, i.e., perform an abrasive operation. The flexible carrier may be a chain, belt, or wire, or any other carrier which is not stiff but flexible. It is thus appreciated that the herein disclosed techniques are applicable to any type of flexible carrier, although chains are often used as example of a suitable flexible drive carrier.

It is appreciated that a flexible cutting tool comprises elements arranged serially, i.e., connected in series. The elements may comprise abrasive material in which case the elements constitute cutting elements. The elements may also be free from abrasive particles and only act as "bumpers" with the purpose to remove the gaps between the cutting elements. Both non-abrasive and abrasive elements will be referred to herein as elements.

A chain also comprises link elements arranged pivotably attached in series.

The cutting tools may be powered by conventional chainsaws or customized tools adapted to power the cutting tool. Abrasive bands and wires may also be powered by conventional power tools or they can be powered by specifically adapted machinery.

Flexible drive carrier cutting tools in the form of cutting chains have lately seen a wide range of cutting applications. More and more challenging materials and cutting scenarios increase the requirements on the chain performance (mainly cutting rate and lifetime) but also on its mechanical flexibility.

Figure 2:
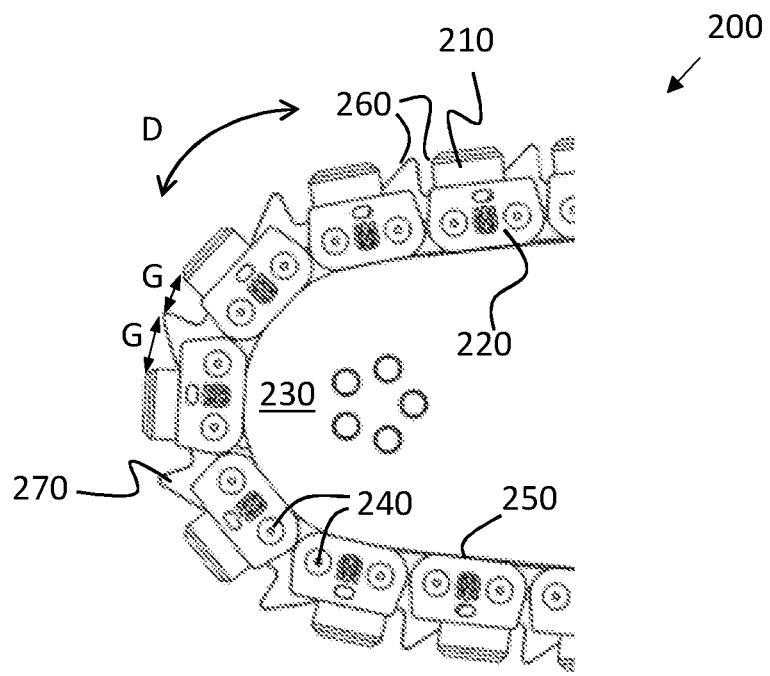

FIGS. 1 and 2 illustrate commonly known designs of diamond cutting chains 100, 200. The design comprises cutting elements 110, 210 having an abrasive coating which are attached to a chain chassis 120, 220 by, e.g., welding, riveting, or gluing.

It is appreciated that many different types of techniques can be employed for attaching elements such as cutting elements to flexible drive carriers, and that the different elements disclosed herein are suitable for a wide range of mounting techniques.

The elements are separated by a certain distance S which follows from the carrier and tool geometry. These distances between elements allow for sufficient flexibility in the chain or drive carrier. For instance, a chain must be able to bend to follow the drive sprocket and also the radius of the guide bar nose 130. At the same time, it must also be somewhat flexible in the opposite bending direction to prevent interferences between chain link elements as it goes out from the cut, since it then tends to vibrate.

These gaps between the elements become pronounced when the chain is bent to an arcuate form as it moves, e.g., over the nose of the chainsaw blade 130, 230. This is because the chain link pivoting points 140, 240 are located close to the bottom of the chain 150, 250, i.e., the part of the chain which contacts the guide-bar. The underlying reasons for the formation of gaps will be further discussed below in connection to FIGS. 14A and 14B, where it is illustrated how gaps can be avoided by moving the pivoting point closer to the abrasive side of the cutting tool, i.e., away from the guide-bar side of the chain.

It is a disadvantage to use a saw chain with gaps in-between elements when operating according to an abrasive principle, since the element edges 160, 260 then hit the material to be cut in a rapid series of impacts, which produces mechanical stress. These impacts and the resulting stress are detrimental to tool life-span, i.e., reduces the number of in-ft which the tool can cut before being worn out and needs to be replaced. The impacts also reduce comfort for operators, both in terms of vibration and in noise level. The impacts furthermore reduce cutting efficiency, since an optimal contacting pressure between the abrasive material and the material to be abraded is hard to maintain in the presence of impacts and severe vibration.

The effect is especially pronounced where the chain is used in hollow structures like pipes, tubes or sandwich materials. The wider the gaps are, the higher is also the risk that the chain snags on the material to be cut.

It is appreciated that this rapid series of impacts is actually the same effect that is used by conventional chain saw chains for cutting, e.g., wood and the like. In this case a series of teeth are arranged on the elements. Each impact by a tooth into the material to be cut then produces a chip, and the tool thus proceeds to form the cut. Some of the elements disclosed herein are abrasive elements void of any teeth arrangement or the like. Rather, an abrasive surface is used to abrade the material to be cut by an abrasive operation. It is appreciated that the cutting tools discussed herein operate according to an entirely different principle from the operating principle of conventional chainsaws.

A central concept underlying the present disclosure is the formation of a segment or element which comprises protruding members that overlap at least one adjacent element or at least one protruding member of an adjacent element on the flexible drive carrier. The adjacent element or member can be a part of the flexible carrier itself or fixedly attached to the flexible drive carrier. The overlapping elements or protruding members can be the same shape, symmetrical or different in shape. Having both the same function or not (abrasive or non-abrasive).

The protruding members have the function to cover or at least reduce the width of the gap which forms when the flexible drive carrier, such as a chain, band, or wire, is bent to an arcuate form. The protruding members each comprises at least one surface portion which is arranged to be in contact with the material or object to be cut. This bending of the flexible drive carrier is common in, e.g., chain saw chains as the chain passes over the guide bar nose.

It is often desired to enter an object to be cut using the nose part. This is because the nose part is often associated with reduced friction due to a spinning nose wheel which gives reduced friction. It is especially important to avoid snagging as the saw enters into the object.

Herein, 'overlapping to reduce a width of a gap formed between the element and the adjacent element when the flexible drive carrier is configured bent in an arcuate form' means that the protruding member imbricates or at least partly covers the adjacent element when seen from the side, i.e., from a direction perpendicular to both the drive direction and to a direction of the abrasive surface of the element. One example of a side view is given in FIGS. 1 and 2, and also in FIG. 6 which will be discussed below.

Figure 6:
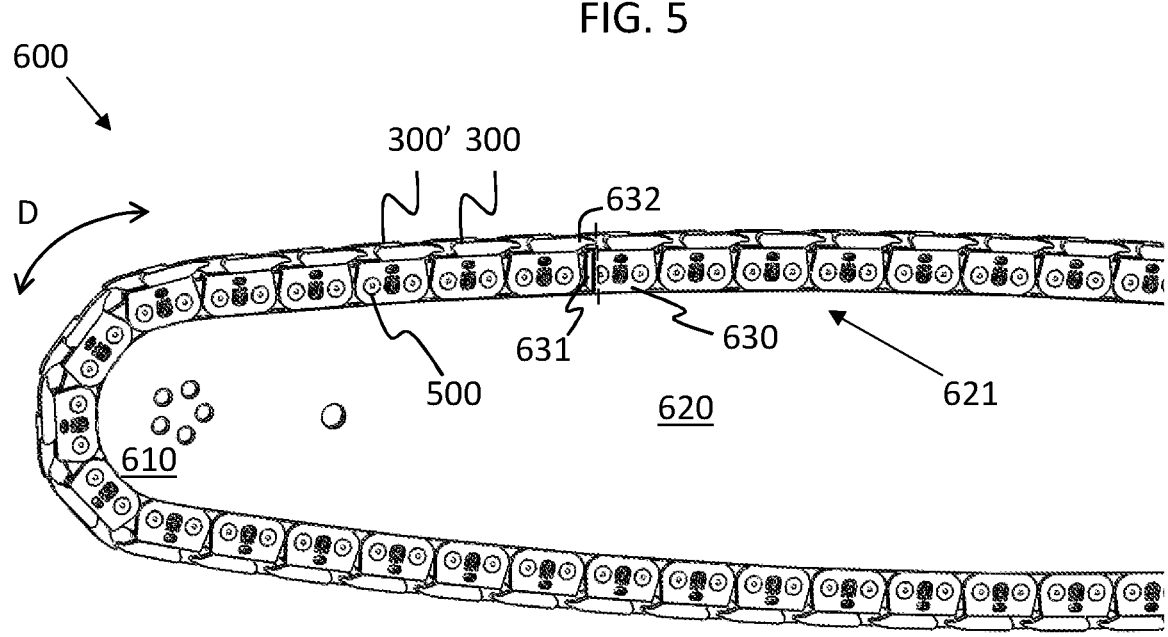
FIGS. 6-9 illustrate an example cutting tool comprising elements.

With reference to FIG. 6, overlapping may also in some cases refer to overlap 631 with a link element 630 of the drive carrier associated with the adjacent element; the protruding member 632 is then configured to overlap with a link element 630 of the drive carrier which supports the adjacent element.

It is appreciated that the feature of overlapping in this context should not be confused by the type of overlapping present between links in a conventional chain saw chain, where tie straps or the like hold link elements together to form a chain. Such link elements are not overlapping in the present terminology since the overlap does not cover or reduce a width of a gap formed between the element and the adjacent element when the flexible drive carrier is configured bent in an arcuate form. For instance, the elements 110, 210 illustrated in FIG. 1 are not overlapping in this sense, nor do they comprise any protruding members arranged to overlap adjacent elements.

It is appreciated that the 'bumpers' present on many regular chain-saw chains, such as the bumpers 270 shown in FIG. 2, are not overlapping any adjacent elements as in the presently disclosed technique. The bumpers 270 are not configured to extend in a direction parallel to the drive direction D to reduce a width of a gap formed between the element and the adjacent element when the flexible drive carrier is configured bent in an arcuate form. Rather, bumbers are usually configured in an extension direction perpendicular to the drive direction.

However, it is noted that the elements disclosed herein can be used as a special type of bumper having a function of covering or reducing the width of the gaps discussed above.

Figure 3A:
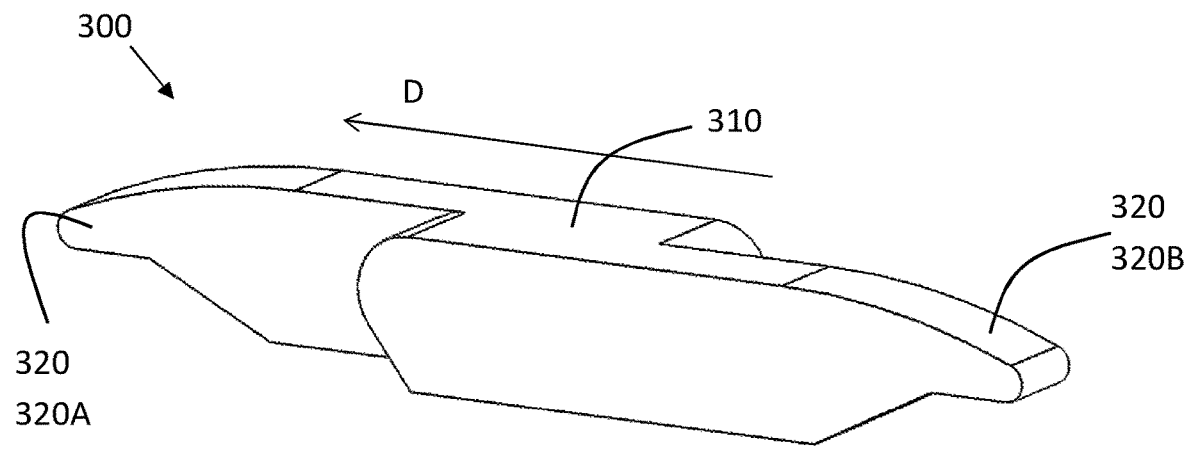
FIGS. 3-4 show example elements for flexible cutting tools.

FIG. 3A shows an element 300 for serial configuration with an adjacent element in or on an abrasive tool. The element is arranged to be mounted on a flexible drive carrier having a drive direction D. The element may be an abrasive cutting element comprising an outer surface 310 suitable for holding an abrasive compound, or it may be a non-abrasive element without any specific pronounced abrasive properties, such as a link element, bumper, or tie strap. Thus, so far, the element 300 is similar to the elements illustrated in FIG. 1 and FIG. 2. It may be configured for an abrasive operation to cut hard materials like stone and concrete.

The element is however notably different from regular chain saw cutting elements which cut using teeth that protrude in a direction opposite to the drive direction and which impact the material to be cut on purpose to produce chips; The element 300 is different from known cutting elements in that it comprises at least one protruding member 320 extending in a direction parallel to the drive direction D. The at least one protruding member is configured to overlap with an adjacent element mounted on the flexible drive carrier at least when the flexible drive carrier has a straight configuration, and to be in contact with a material to be cut by the abrasive cutting tool, thereby reducing a width of a gap G formed between the element and the adjacent element when the flexible drive carrier is configured bent in an arcuate form.

It is noted that the protruding member is not necessarily configured to be in constant contact with the material to be cut. According to some aspects the protruding member only contacts the material intermittently, such as when the flexible drive carrier is bent in an arcuate shape.

According to some aspects, the element has an elongate shape extending in the drive direction D and the at least one protruding member has a rounded shape configured to follow a pre-defined arcuate form. The rounded shape of the protruding members is exemplified in FIG. 3A. For instance, this rounded shape can be matched to the rounded shape of a nose section of a chain-saw guide-bar. Due to the rounded shapes of the protruding members, a more homogenous outer surface can be presented when the flexible drive carrier is bent. This is an advantage since vibration is reduced and efficiency is increased. This almost homogenous surface is exemplified in FIG. 6.

FIG. 3A shows an example element 300 with two protruding members 320. Thus, according to an example, the element 300 comprises a first protruding member 320A and a second protruding member 320B. The first protruding member protrudes in the drive direction D, while the second protruding member protrudes in a direction opposite to the drive direction.

The element 300 may be an abrasive cutting element, in which case an abrasive compound may be arranged on a cutting surface of the element. The whole element may also be formed from an abrasive material, such as an abrasive matrix or the like.

Figure 3B:
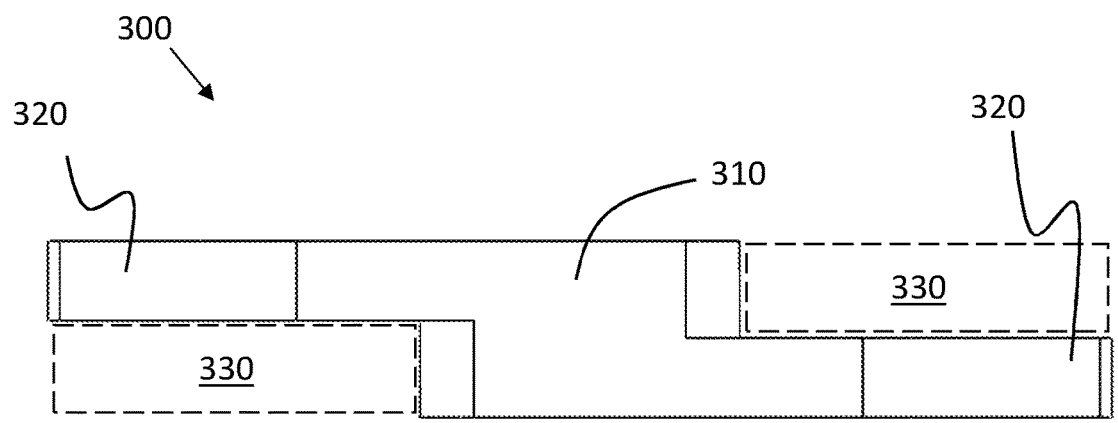

FIG. 3B shows a top view of the element 300. The element 300 has a recess or cut-out section 330 configured to receive a protruding member 320 from an adjacent element arranged on the flexible drive carrier. This way, when the chain has a straight configuration, i.e., when the flexible drive carrier is extended stretched and not bent in an arcuate form, the protruding members fit into the respective recesses and thus will not hamper the abrasive operation. However, when the chain is bent in an arcuate form, then the protruding members will gradually exit the recesses and cover the gap G which forms between elements as the flexible drive carrier is bent. This effect of the protruding members covering the gap as the flexible drive carrier is bent to an arcuate form is shown in more detail in FIG. 7.

Figure 4A:
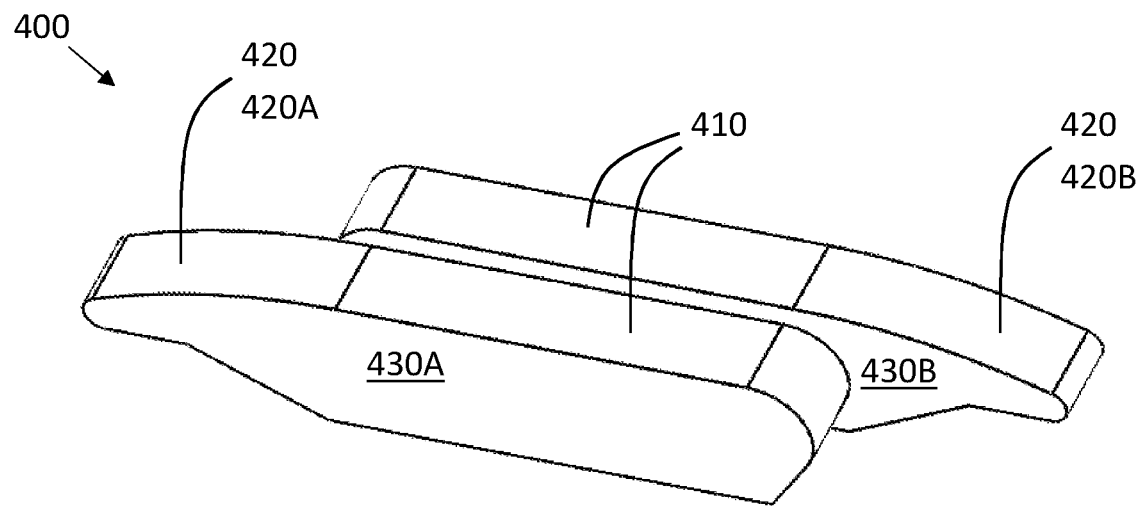

FIG. 4A shows another example element 400 according to the present teaching. This element comprises two sections 430A, 430B. The first section comprises a first protruding member 420A, and the second section comprises a second protruding member 420B. The first protruding member 420A protrudes in a direction parallel to the drive direction D, while the second protruding member 420B protrudes in a direction opposite to the drive direction D.

Figure 4B:
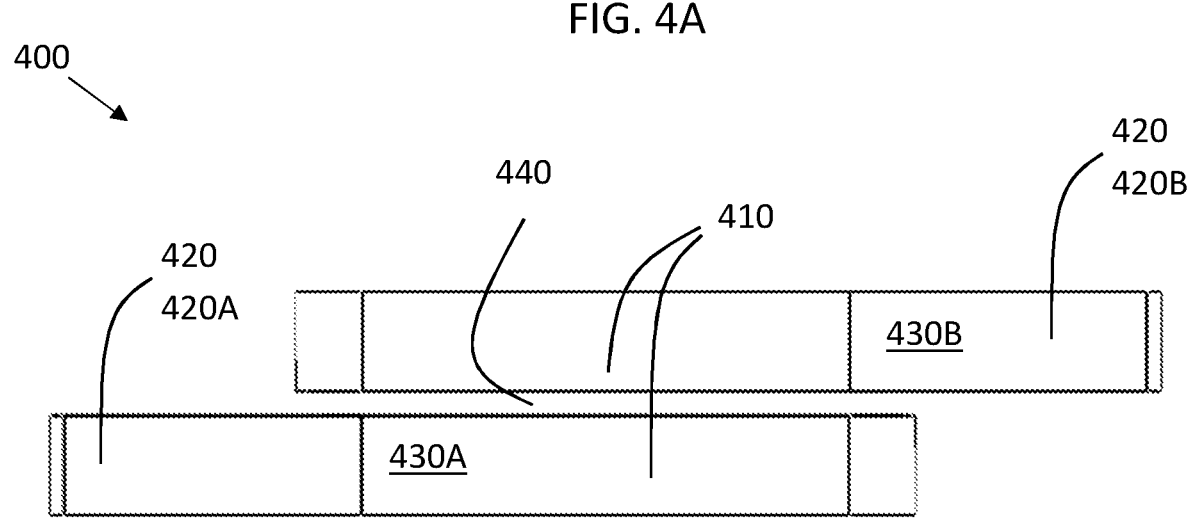

FIG. 4B shows a top view of the element 400. Here it can be seen that a small distance 440 is arranged between the two sections. This distance permits the two sections to move slightly with respect to each other without contact, which can be an advantage in some scenarios. Again, the protruding members may be arranged with a rounded shape in order to better follow an arcuate form such as, e.g., a nose section of a chainsaw guide-bar.

FIG. 20A shows a top view and 20B shows a perspective view of another example element 2000 for serial configuration with an adjacent element in or on an abrasive tool. FIG. 20C shows part of a tool comprising the element 2000. The element is arranged to be mounted on a flexible drive carrier having a drive direction D. The element may be an abrasive cutting element comprising an outer surface 2010 suitable for holding an abrasive compound, or it may be a non-abrasive element without any specific pronounced abrasive properties, such as a link element, bumper, or tie strap. The element 2000 also comprises at least one protruding member 2020 extending in a direction parallel to the drive direction D. The at least one protruding member is configured to overlap with an adjacent element mounted on the flexible drive carrier at least when the flexible drive carrier has a straight configuration, and to be in contact with a material to be cut by the abrasive cutting tool, thereby reducing a width of the gap G formed between the element and the adjacent element when the flexible drive carrier is configured bent in an arcuate form. The protruding members 2020 may be arranged with a rounded shape in order to better follow an arcuate form such as, e.g., a nose section of a chainsaw guide-bar.

Figure 21A:
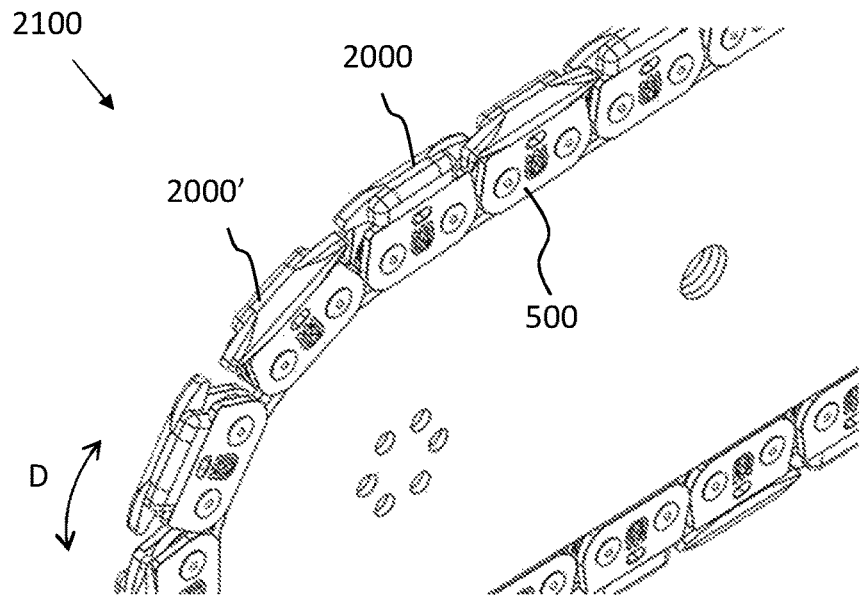
Figure 21B:
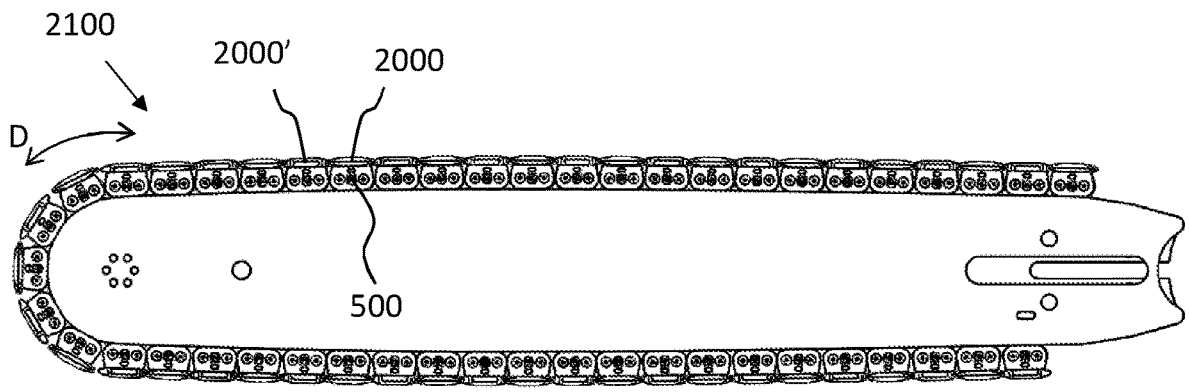

FIGS. 21A and 21B illustrate an abrasive cutting tool 2100 comprising a sequence of consecutive elements 2000, 2000' corresponding to the elements illustrated in FIGS. 20A, 20B and 20C. Note that every other element is 'flipped' along the extension direction of the drive carrier 500 in order to enable the feature of overlapping protruding members.

Figure 22A:
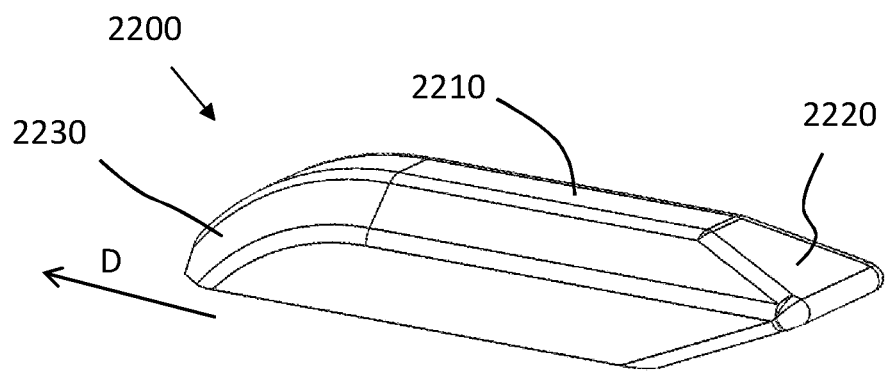
Figure 22B:
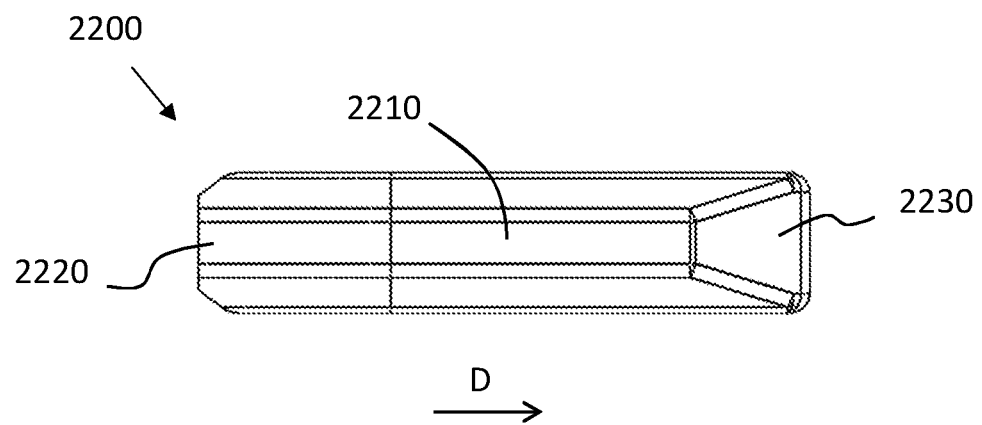

FIG. 22A shows a side perspective view and FIG. 22B shows a top view of yet another example element 2200 for serial configuration with an adjacent element in or on an abrasive tool. The element is arranged to be mounted on a flexible drive carrier having a drive direction D. The element may be an abrasive cutting element comprising an outer surface 2210 suitable for holding an abrasive compound, or it may be a non-abrasive element without any specific pronounced abrasive properties, such as a link element, bumper, or tie strap. The element 2200 also comprises a protruding member 2220 extending in a direction parallel to the drive direction D. Here, a single protruding member extends in a direction opposite to the drive direction D, i.e., arranged trailing the element 2200. The protruding member 2220 is configured to overlap with an adjacent element mounted on the flexible drive carrier at least when the flexible drive carrier has a straight configuration, and to be in contact with a material to be cut by the abrasive cutting tool, thereby reducing a width of the gap G formed between the element and the adjacent element when the flexible drive carrier is configured bent in an arcuate form. The protruding member 2220 is arranged with a rounded shape in order to better follow an arcuate form such as, e.g., a nose section of a chainsaw guide-bar.

The leading edge 2230 of the element 220 has a tapered shape which allows overlap with an adjacent element 2200'. The tapered leading edge provides an increased resilience to mechanical impact and reduces snagging.

Figure 23A:
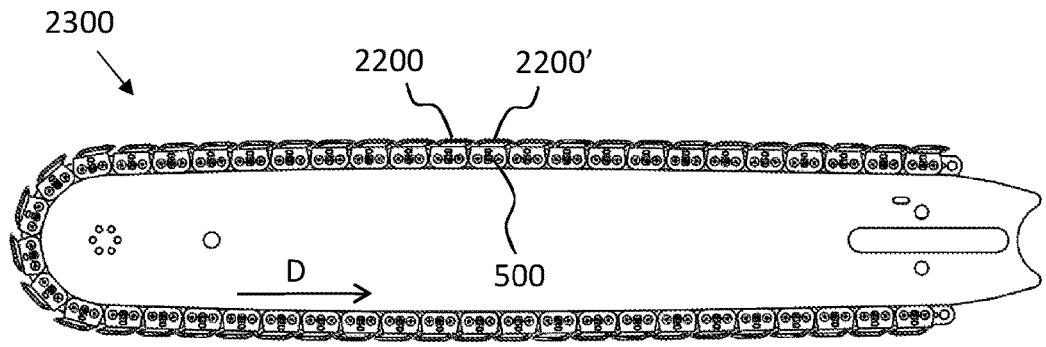
Figure 23B:
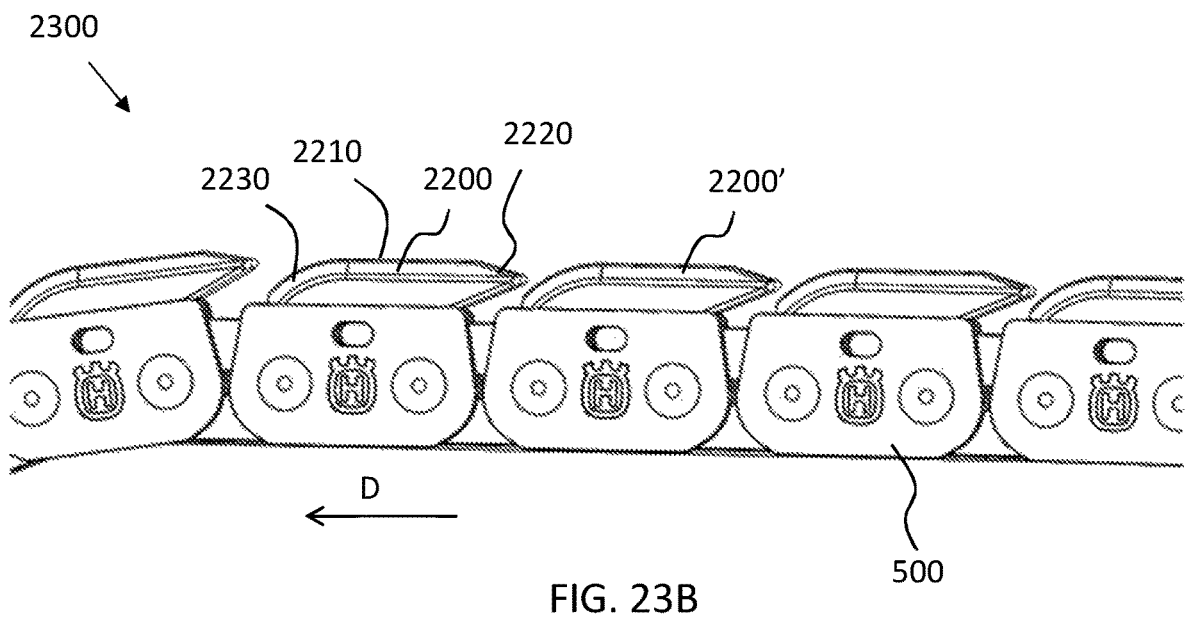

FIGS. 23A and 23B illustrate an abrasive cutting tool 2300 comprising consecutive elements 2200, 2200' corresponding to the element shown in FIGS. 22A and 22B.

It is appreciated that FIGS. 3A, 3B, 4A, 4B, 20A, 20B, and 22 are examples of the present technical teaching. A wide variety of different geometries can be arranged with similar effect following the principle of configuring one or more protruding members overlapping adjacent elements in order to reduce the width of a gap formed between elements as the flexible drive carrier is bent to an arcuate form. Examples of other such geometries will be discussed below in connection to, e.g., FIGS. 11-16.

The elements and other link elements disclosed herein can be made of various grades of steel. They can for instance be manufactured by machining or powder metallurgy or any other adequate technique. They may be made of diamonds or any abrasives matrix (metal or resin based) or covered with a substrate of diamonds or any other abrasive coating. The substrate of abrasive elements can be made by galvanic deposition, vacuum brazing or any other sintering method. The abrasive grit itself can also be fixed mechanically to the element, such as a PCD insert for example. The diamond grit size, concentration, and the hardness of the brazing bond can be adjusted depending on the application requirements. The geometry or active surface (diamonds in contact with the material) can be adapted depending on the performance required. Diamonds or any other abrasive substrate can be present on the whole element or on the overlapping members only. Also, the overlapping members can be configured without any abrasive substrate and only act as common bumpers between cutting parts.

Figure 5:
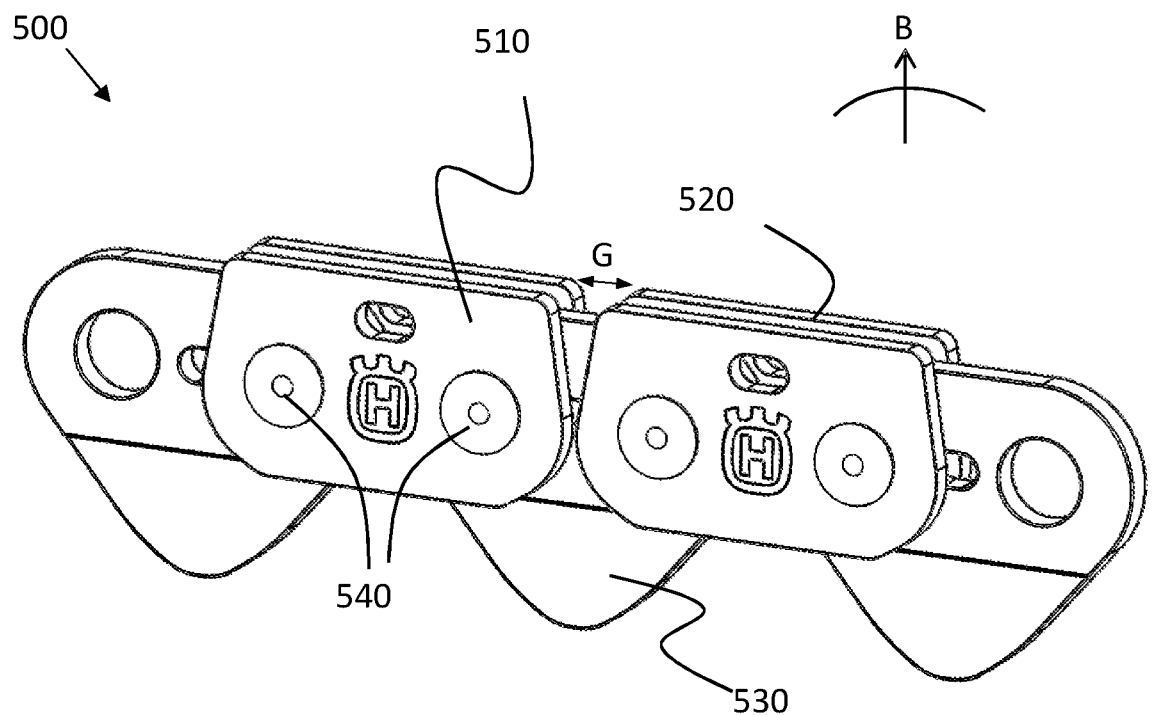
FIG. 5 schematically illustrates a section of a flexible drive carrier.

FIG. 5 schematically illustrates a section of a flexible drive carrier 500. The chain comprises link elements 510 connected together by connecting elements 530. The connecting elements 530 are here also used as drive links in the chain. The flexible drive carrier 500 is also shown in connection to the elements 2000, 2200 in FIGS. 21 and 23.

Each of the link elements 510 comprises a surface or section 520 to which an element 300, 400, 2000, 2200 can be attached by, e.g., welding, brazing, crimping, riveting, gluing, or the like. The attached element may be an abrasive cutting element, or a non-abrasive element.

The link elements pivot around pivoting points 540, here constituted by rivets. As the chain is bent in direction B, the gaps G between link elements widen. When the flexible drive carrier 500 has a straight configuration then the gaps G are relatively small and element edges are located fairly close to each other. However, as the link elements pivot with respect to each other when the flexible drive carrier is bent to an arcuate form, the gaps widen. The protruding elements, due to the overlap with adjacent elements, will cover this widening gap. In other words, when the flexible drive carrier is bent, the protruding elements no longer overlap with adjacent elements to the same extent, and instead cover the gap which forms due to the bending of the flexible drive carrier.

FIG. 6 shows an example cutting tool 600 which comprises a flexible drive carrier 500 in the form of a chain, and a plurality of elements 300, 300' attached thereto. Thus, FIG. 6 shows an example abrasive cutting chain for use with a chain saw.

During abrasive operation using the cutting tool 600, the elements 300, 300' first traverse the flatter part 621 of the guide-bar 620. Here the protruding members overlap with preceding and following elements and do not hamper operation. As the chain is bent into an arcuate form over the nose section 610 of the guide-bar, the elements are pulled apart due to the relative locations of the pivoting points of each link element. However, due to the protruding members, no gap is formed between elements. Thus, there can be no snagging nor impact by the element sides on the material to be cut. Rather, a continuous surface is presented towards the material to be cut at all times, which is an advantage. The cutting tool is furthermore allowed to bend slightly in the opposite direction to the arcuate form bend direction and therefore permits some vibration during abrasive operation, which is an advantage.

According to an example, a chain such as that illustrated in FIG. 6 may be associated with a pitch of 0.438". The thickness of the chain at the widest point may be configured at around 6.2 mm measured including an abrasive diamond coating. A total length of overlapping when the chain is in a straight configuration may be around 30 mm.

A suitable chainsaw for driving the cutting tool may be a 6.5 horsepower (HP) petrol chainsaw using a 16" guide bar with an 8 teeth sprocket. The cutting operation can be performed with water cooling and the revolution of the engine can be maintained at 8000 revolutions per minute, rpm.

An advantage of the proposed elements and associated cutting tools, besides gains in cutting rate performance, is a significant improvement in tool lifetime.

This is due to the reduced stress levels on, e.g., chain rivets and the like which follows from the reduction in impacts.

There is also a reduced risk of using the tool compared to known tools for similar purposes due to the reduced risk of snagging and kick-back, which is an advantage.

Figure 7:
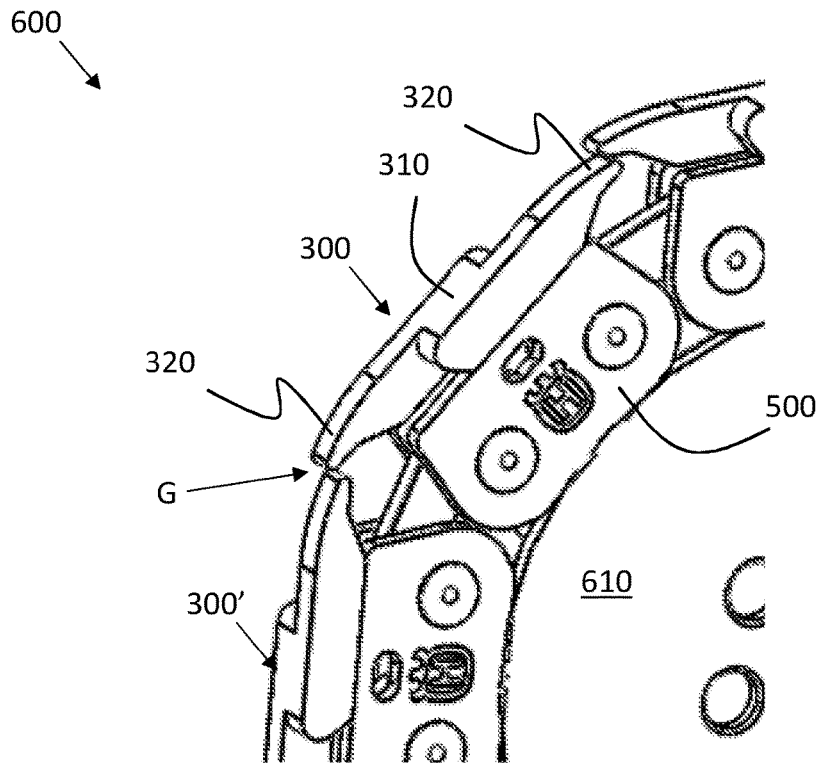

FIG. 7 shows a more detailed view of the nose section 610. It can be seen that the elements are separated by the bending of the chain, but that the protruding members cover the gap G to present a continuous surface towards the material to be cut.

Figure 8:
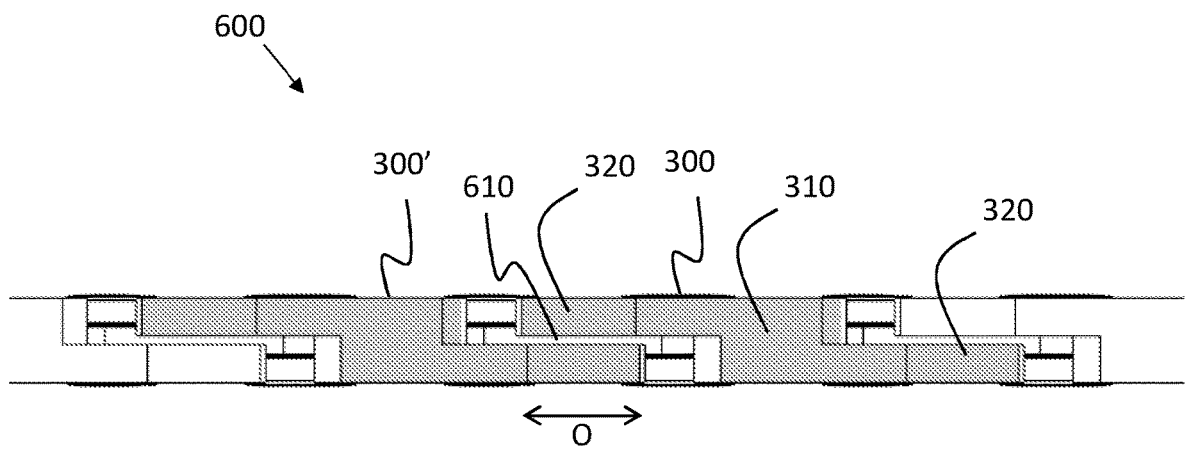

FIG. 8 shows a top view of the cutting tool 600 with the flexible drive carrier and the elements 300, 300'. It is noted that the elements are separated by a small distance 610 in order to permit some relative movement as the flexible drive carrier vibrates during abrasive operation.

According to an example, an overlapping distance O of the protruding member with respect to the adjacent element is at least 5 mm, and preferably between 7 mm and 8 mm.

According to some aspects, the protruding member is configured to overlap with an adjacent element mounted on the flexible drive when the flexible drive carrier is bent in an arcuate form defined by a curvature of a nose part of a chainsaw guide-bar. For example, the protruding member may be configured to overlap by at least 0.75 mm with an adjacent element mounted on the flexible drive carrier when the flexible drive carrier is bent in an arcuate form defined by a curvature of a nose part of a chainsaw guide-bar.

Figure 9:
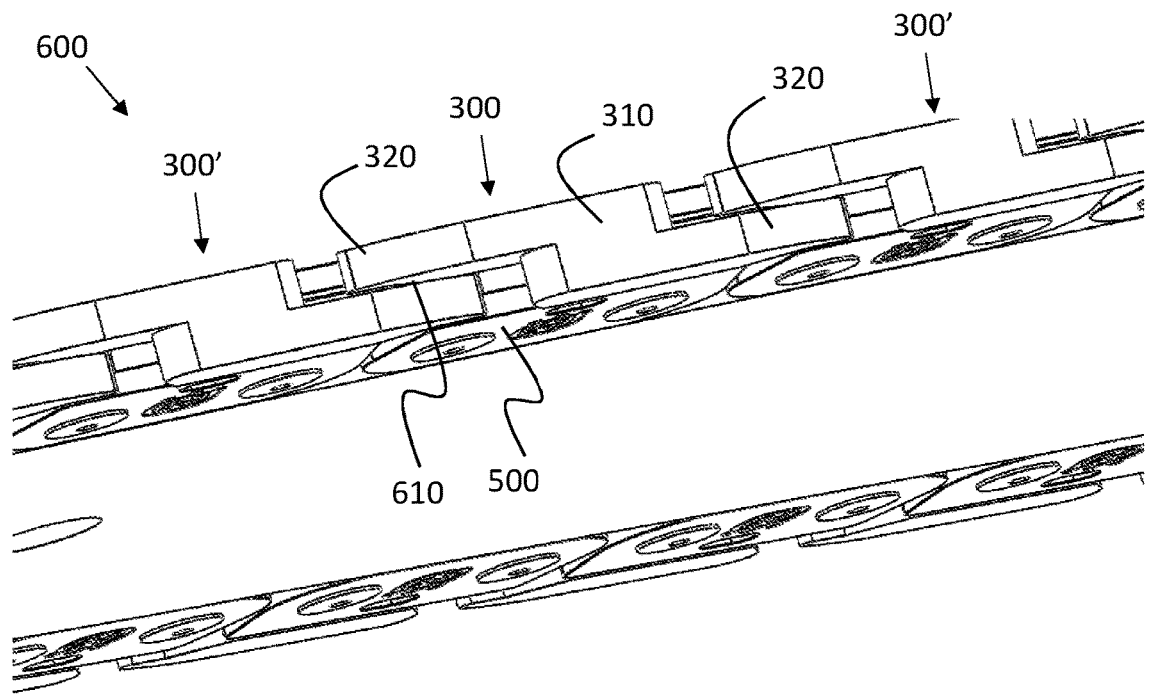

FIG. 9 shows a further view of the cutting tool 600. The overlap between the protruding member 320 and the adjacent element 300' when the flexible drive member has a straight configuration can be clearly seen. The distance 610 between protruding members of respective adjacent elements 300, 300' can also be seen. The separation margins between elements allow for the chain to bend in both directions, and also reduces stiffness of the chain, which is an advantage.

Figure 10:
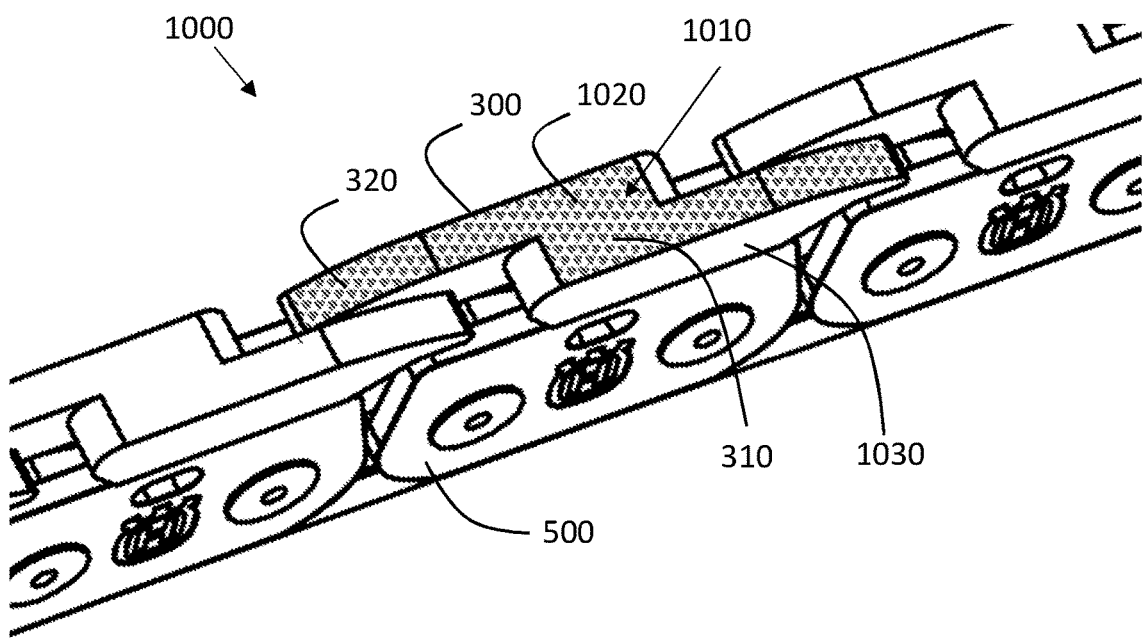
FIG. 10 illustrates an example cutting element with an abrasive coating.

FIG. 10 illustrates an example coating of abrasive material 1010 on the outer surface 310 of the element 300. The abrasive coating has been applied on the flat surface 1010, and also on the protruding members 320. The example shown in FIG. 10 has no abrasive coating on the sides 1030. It is appreciated that the abrasive coating can also be applied to the sides 1030 of the element, which may offer advantages in some cutting scenarios.

According to aspects, the abrasive compound comprises any of diamond (natural or synthetic), polycrystalline diamond, aluminum oxide, silicon carbide, ceramic, or cubic boron nitride. Other suitable abrasive materials and compounds also exist.

As an alternative, or a complement to applying the abrasive compound as a coating to the outer surface, the element can be made at least partly from a metal or resin based abrasive matrix.

The element may, according to aspects, also be a non-abrasive element arranged on the flexible drive carrier, such as a link in a chain. For instance, the element may be a non-abrasive bumper element, or a tie strap element, or the like. In this case abrasive elements may be arranged in-between elements on the flexible drive carrier. When the element is non-abrasive, it may be referred to as a link element of a flexible drive carrier element.

The element may also be integrated in the chain chassis, i.e., constitute a part of the flexible drive carrier 1220. In this case the element is not separately manufactured and attached to the flexible drive carrier but manufactured together with the flexible drive carrier as a single unit. Thus, according to some aspects, the element may constitute a link 1150 in a chain 1120.

Figure 11:
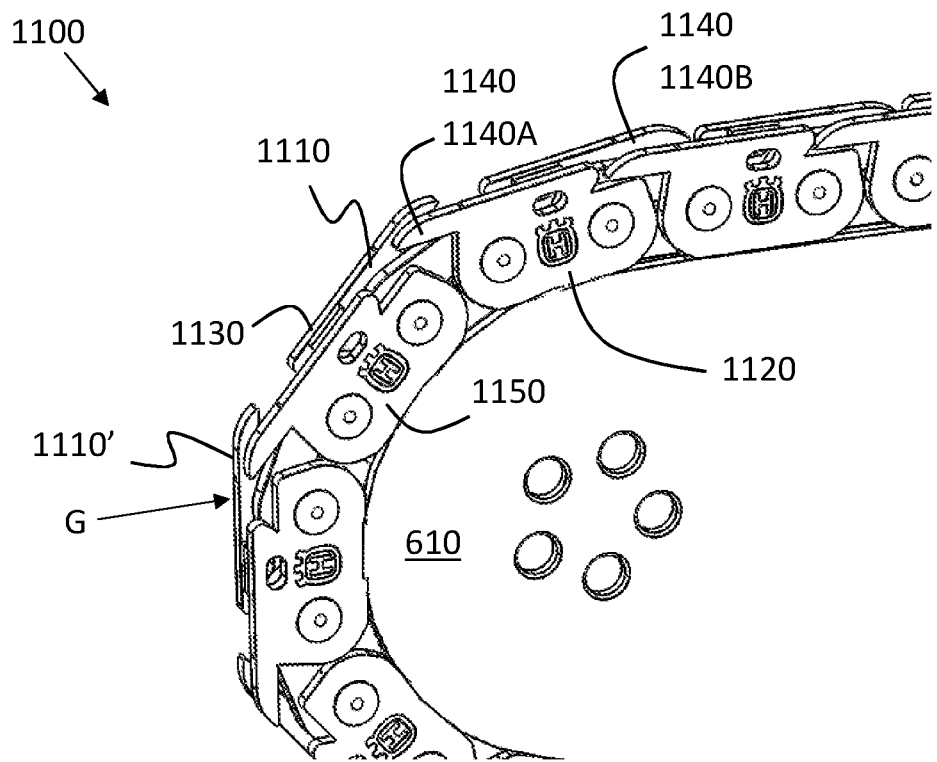

One such example is illustrated in FIG. 11, which shows a cutting tool 1100. Protruding members 1140 extend from link elements 1110 and overlap adjacent link elements 1110' when the cutting chain has a straight configuration. When the chain is bent the link elements 1120 separate to create a gap G, but the protruding members cover this gap. Therefore, a continuous abrasive surface is presented to abrade the material to be cut.

An abrasive coating can be applied directly onto the link elements 1100 to provide an abrasive cutting operation.

Figure 12:
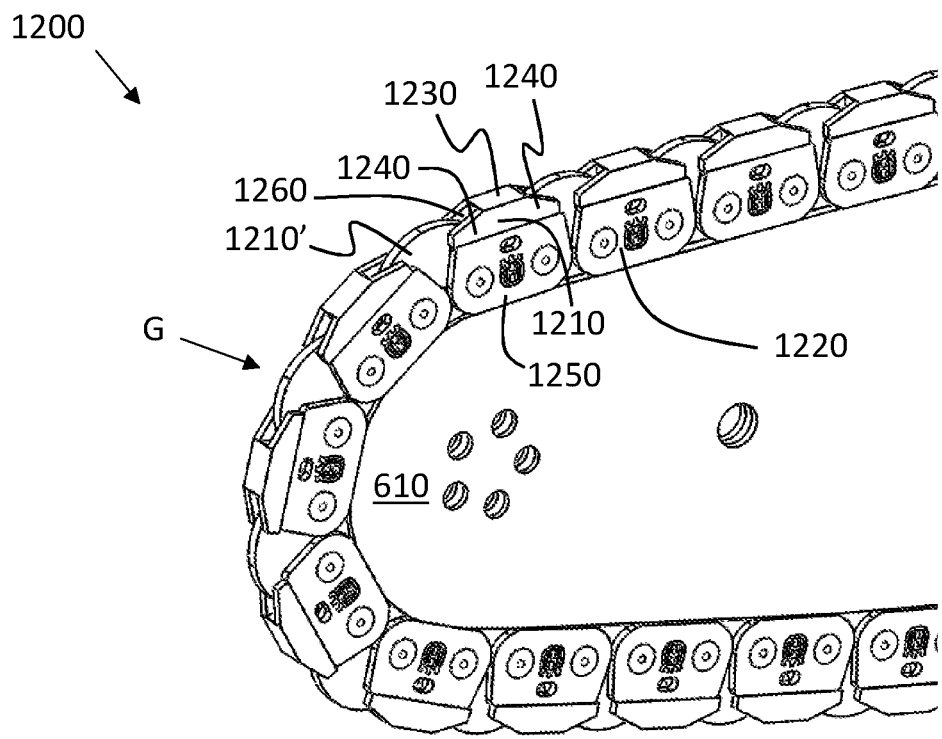

FIG. 12 illustrates another example of a cutting tool 1200 which implements the present technique of using overlap to reduce a width of a gap G formed between elements as the flexible drive carrier is bent in an arcuate form.

FIG. 12 shows a cutting chain 1200 comprising a plurality of link elements 1250 joined together by connecting elements 1210' having a rounded form. The connecting elements extend in respective slots 1260 formed in the link elements 1250 along a center line of the link elements in the drive direction D, thereby filling a gap G formed between two link elements when the cutting chain 1200 is bent in an arcuate form. A respective plurality of elements 1210 are mounted on the link elements 1250 and configured for an abrasive operation.

It is appreciated that the elements may comprise part of the slot 1260 or have a shape such that no slot 1260 is necessary, in which case the slot 1260 is only formed in the link elements 1250. The elements 1210 may be formed from an abrasive material and/or comprise and abrasive coating as discussed above.

It is realized that, as the chain 1250 is bent over the nose section 610, there are gaps formed between the link elements 1250. However, due to the rounded shape and overall geometry of the connecting elements 1210', a near-continuous surface without gaps is presented to abrade the material to be cut. Consequently, as discussed above, cutting tool life is prolonged since there is reduced stress due to the absence of impacts. There are also less vibrations and noise leading to an increased comfort for the operator. Finally, since there are no sharp-edged gaps, the risk of snagging is reduced, leading to reduced risk of kick-back and this improved safety.

It is noted that the connecting elements 1201' may also be elements, i.e., the connecting elements 12010' may comprise an abrasive coating, or may be formed from an abrasive material, such as a metal or resin based abrasive matrix. Using also the connecting elements for abrasive operation increases the cutting performance of the cutting tool.

FIG. 13 illustrates yet another example of a cutting tool 1300 where elements 1310 have been mounted on a flexible drive carrier 500. The elements 1310 are partitioned into two segments, similar to the arrangement in FIGS. 4A and 4B. Each segment comprises a protruding member 1330 extending in a direction parallel to the drive direction D. The elements 1310 have a slightly rounded outer surface shape to better follow the arcuate form as the chain passes over the nose section 610 of the guide-bar. This rounded shape presents a smoother abrasive surface which improves cutting performance and evens out wear on the elements.

It is noted that the gap G is not completely covered by the elements near the center E of the nose section 610 where the arcuate form is at its most pronounced. It is emphasized that it is not necessary to completely cover the gap G by any of the disclosed elements, a significant reduction of the gap G, still leaving a small residual gap, is sufficient to obtain the above discussed advantages of reduced wear, improved cutting efficiency, and improved comfort.

FIGS. 14A and 14B illustrate another solution to the problem of reducing the gap G when the flexible drive carrier is bent in an arcuate form, which also illustrates the underlying reasons for the formation of the above-mentioned gap G. Here, a cutting tool 1400 is illustrated where the pivot point 1470 around which the link elements rotate when the chain is bent has been moved up closer to the cutting side 1560 of the cutting tool as opposed to being located at a center or closer to a guide-bar side 1450 which is the case for the above illustrated chains. This causes the gap G to form in a different way as the flexible drive carrier is bent in an arcuate form 1400', around a nose section of a guide-bar for instance. The cutting tool 1400 shows gaps on a guide-bar side of the tool when the flexible drive carrier has a straight configuration, which gaps on the guide-bar side of the tool is reduced as the chain passes over the nose section 610. Thus, a near continuous surface is presented which can be used to abrade a material to be cut.

In summary, FIGS. 14A and 14B schematically illustrate a cutting chain 1400 comprising a plurality of link elements 1410 connected together by tie straps 1420. The tie straps are arranged on a cutting side 1460 of the cutting chain opposite to a guide bar side 1450 of the cutting chain. Spaces 1440, here shown as wedge-shaped spaces, are formed between the link elements 1410 when the cutting chain 1400 has a straight configuration, thereby allowing bending of the cutting chain to an arcuate form 1400' without significant gaps G forming between link elements on the cutting side 1460 of the cutting chain when the cutting chain has the arcuate form.

Figure 15:
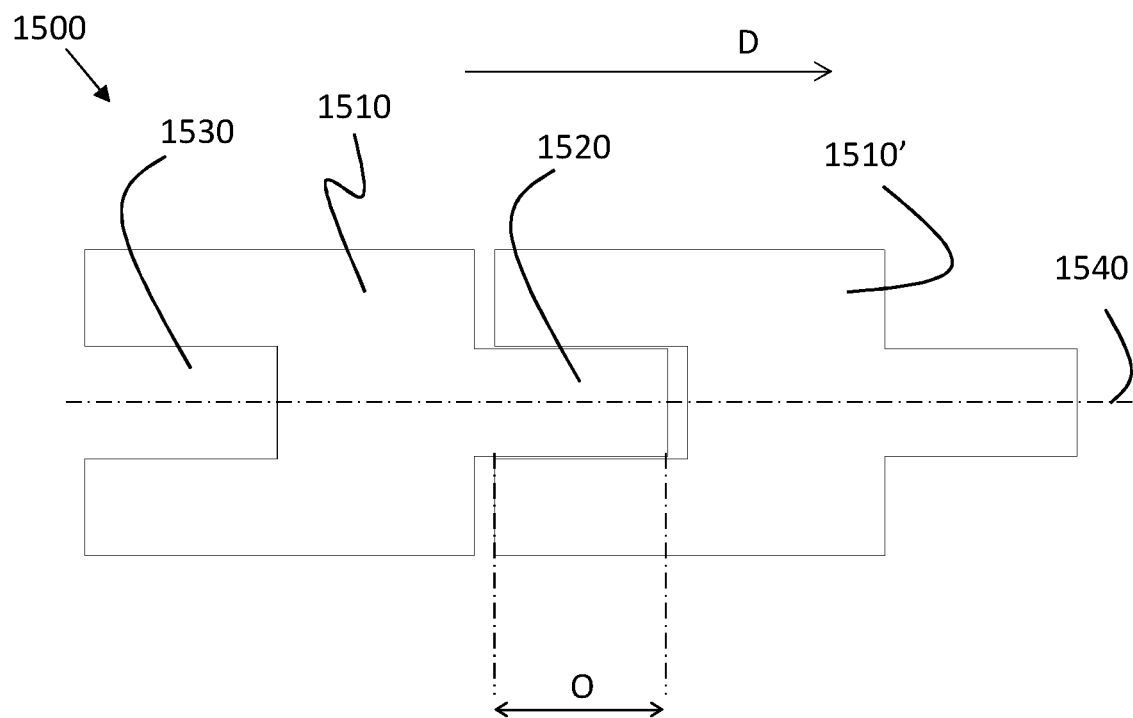
FIGS. 15-16 illustrate elements.

There are many different geometries that can be used with an element in order to obtain the herein discussed technical effects of reducing gaps between elements when a flexible drive carrier is bent in an arcuate form. FIG. 15 shows one example 1500, where a protruding member 1520 extends in the drive direction D along a center line 1540 of the element 1510. The protruding member overlaps an adjacent element 15010' by entering a recess 1530 formed in an opposite end of the element. When the flexible drive carrier is bent, then the protruding member exits the recess and covers a gap formed between elements.

Figure 16:
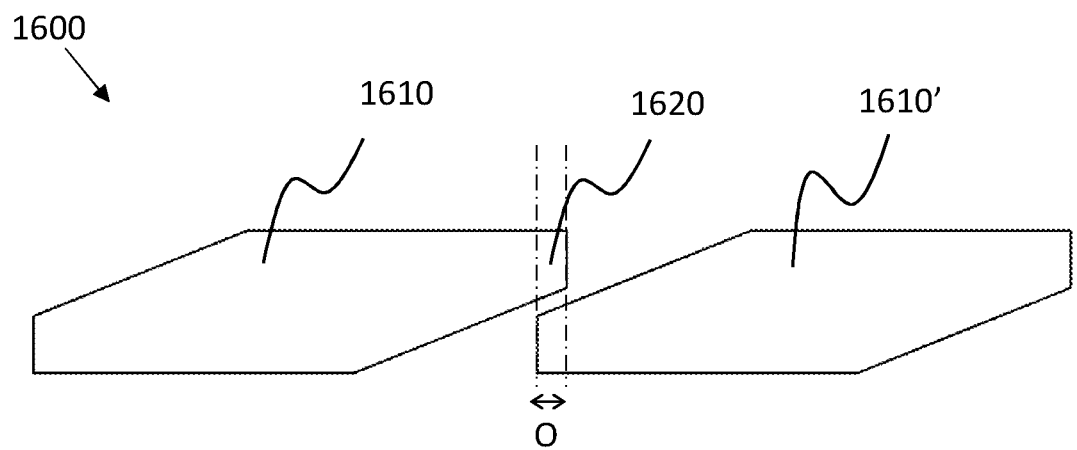

FIG. 16 shows another example geometry which can be used with the elements. Here the elements 1610 are given a rhombic shape, where a protruding member 1620 is part of the rhombic shape. As the elements 1610, 1610' are pulled apart, an overlap O is maintained due to the rhombic shape having the protruding members.

FIG. 17 illustrates a flexible drive carrier in the form of a belt. The belt 1720 together with a plurality of elements 1710, 1710' forms an abrasive band 1700. The elements 1710 have protrusions which overlap adjacent elements 1710' when the flexible drive member is bent in an arcuate form. Due to the protrusions, the width of a formed gap between elements are reduced. In the example of FIG. 17, the gap is eliminated.

FIG. 18 illustrates a flexible drive carrier in the form of a wire 1800. The wire 1800 comprises a flexible drive wire 1820 and a plurality of elements 1810, wherein the elements constitute beads on the wire. The elements, i.e., the beads, comprise protrusions which overlap adjacent elements 1810'. Thus, again, due to the protrusions the width of a formed gap between elements is reduced when the wire is bent in an arcuate form.

Consequently, according to aspects, the flexible drive carrier is any of a belt 1720 or a wire 1820.

FIG. 19 illustrates a method for producing an element 300, 400, 1110, 1210, 1310, 1510, 1610, 1710, 1810 for an abrasive cutting tool 600, 1100, 1200, 1300, 1700, 1800, arranged to be mounted on a flexible drive carrier 500, 1120, 1220, 1720, 1820 having a drive direction D. The method comprises;

configuring S1 an element comprising an outer surface 310, 410, 1130, 1230, 1330 for holding an abrasive compound 1010 configuring S2 the element with at least one protruding member 320, 420, 1140, 1240 extending in a direction parallel to the drive direction D, and arranging S3 the at least one protruding member such that it overlaps with an adjacent element 300', 1110', 1210', 1310', 1510', 1610', 1710', 1810' mounted on the flexible drive carrier 500, 1120, 1220, 1720, 1820 at least when the flexible drive carrier has a straight configuration, and such that it reduces a width of a gap G formed between the element and the adjacent element when the flexible drive carrier is configured bent in an arcuate form.

Thus, the method produces an element according to the above discussion and associated with the same advantages.

The invention claimed is:

1. An abrasive cutting tool comprising:
   a flexible drive carrier comprising:
      a plurality of link elements including a link element and an adjacent link element disposed in a serial configuration, the flexible drive carrier having a drive direction for performing cutting;
      a connecting element disposed between the link element and the adjacent link element such that the connecting element is configured to pivot relative to the link element and the adjacent link element, and
   an element coupled to the link element that is arranged to be in contact with a material to be cut by the abrasive cutting tool, the element comprising a trailing protruding member extending towards the adjacent link element in a direction opposite and parallel to the drive direction of the flexible drive carrier, the trailing protruding member being formed from or coated by an abrasive compound and the trailing protruding member being configured to contact the material to contribute to cutting the material by the abrasive cutting tool,
   wherein the trailing protruding member is configured to:
      overlap a top surface of the adjacent link element in a plane perpendicular to the drive direction at least when the flexible drive carrier has a straight configuration, and
      cover a portion of a width of a gap formed between the link element and the adjacent link element when the flexible drive carrier moves through a bend in an arcuate form.

2. The abrasive cutting tool according to claim 1, wherein the element including the trailing protruding member is formed from or coated by the abrasive compound.

3. The abrasive cutting tool according to claim 2, wherein the abrasive compound comprises any of natural or synthetic diamond, polycrystalline diamond, aluminum oxide, silicon carbide, ceramic, or cubic boron nitride.

4. The abrasive cutting tool according to claim 3, wherein an outer surface of the element is coated by the abrasive compound.

5. The abrasive cutting tool according to claim 2, wherein the abrasive compound is at least partly made from a metal or resin based abrasive matrix.

6. The abrasive cutting tool according to claim 1, wherein the connecting element is non-abrasive and is not configured to contribute to the cutting of the material.

7. The abrasive cutting tool according to claim 1, wherein a leading edge of the trailing protruding member has a rounded or tapered shape.

8. The abrasive cutting tool according to claim 1, wherein the abrasive cutting tool is an abrasive cutting chain for use with a chain saw.

9. The abrasive cutting tool according to claim 1, wherein the trailing protruding member is configured to overlap with an adjacent element mounted on the adjacent link element when the flexible drive carrier is bent in an arcuate form defined by a curvature of a nose part of a chainsaw guide-bar.

10. The abrasive cutting tool according to claim 1, wherein the element further comprises a leading protruding member that protrudes in the drive direction and extends towards a forward adjacent link element in a same direction as the drive direction of the flexible drive carrier;
wherein the leading protruding member is configured to:
overlap a top surface of the forward adjacent link element at least when the flexible drive carrier has the straight configuration, and
cover a portion of a width of a gap formed between the link element and the forward adjacent link element when the flexible drive carrier moves through the bend in the arcuate form;
wherein the forward adjacent link element is one of the plurality of link elements.

11. The abrasive cutting tool according to claim 1, wherein an overlapping distance of the trailing protruding member with respect to the adjacent link element is at least 5 millimeters.

12. The abrasive cutting tool according to claim 1, wherein the trailing protruding member is configured to overlap the top surface of the adjacent link element by at least 0.75 millimeters when the flexible drive carrier is bent in an arcuate form defined by a curvature of a nose part of a chainsaw guide-bar.

13. A chain-saw comprising the abrasive cutting tool according to claim 7 and a chain-saw guide-bar;
wherein the rounded shape of the leading edge of the trailing protruding member matches a rounded shape of a nose section of a chain-saw guide-bar.

14. A chain comprising:
a plurality of elements configured to perform abrasive cutting, each element of the plurality of elements comprising a first sidewall comprising a first protruding member, a second sidewall comprising a second protruding member, and an outer surface extending from the first sidewall to the second sidewall, wherein the outer surface is a cutting surface, the first protruding member comprises a first ramped portion, and the second protruding member comprises a second ramped portion, wherein the first sidewall and the second sidewall are spaced apart and are connected by the cutting surface, wherein the first side wall and the second side wall are longer than the cutting surface, wherein the first ramped portion of the first side wall and second ramped portion of the second side wall extend beyond the cutting surface to form an element slot between the first ramped portion and the second ramped portion that is adjacent to the cutting surface and open on an outer top side of each element, the outer top side being opposite an inner bar interface side of each element of the plurality of elements;
a plurality of link elements, each link element comprising a first side member and a second side member, the first side member and the second side member of each link element defining surfaces upon which a respective element of the plurality of elements is disposed; and
connecting elements that join the link elements together and have a rounded form, wherein each connecting element extends into a respective slot formed between the first side member and the second side member of a respective link element and each connecting element extends into a respective element slot formed between the first ramped portion of the first sidewall and the second ramped portion of the second sidewall of a respective element of the plurality of elements such that the connecting element extends through the respective element slot and at least partially beyond an outer top surface of the first ramped portion and an outer top surface of the second ramped portion wherein each connecting element fills a gap formed between two adjacent ones of the plurality of link elements when the chain is bent in an arcuate form and the rounded form of the connecting elements extends into the gap between the two adjacent ones of the plurality of link elements having a substantially same height as the elements.

15. The chain of claim 14, wherein the cutting surface is disposed within a plane that remains parallel to a chain saw bar such that the plane of the cutting surface does not intersect with the chain saw bar during rotation of the chain about the chain saw bar.

16. A method for producing an abrasive cutting tool comprising:
providing a flexible drive carrier comprising a plurality of link elements including a link element and an adjacent link element disposed in a serial configuration, the flexible drive carrier having a drive direction for performing cutting;
providing a connecting element disposed between the link element and the adjacent link element such that the connecting element is configured to pivot relative to the link element and the adjacent link element; and
providing an element coupled to the link element that is arranged to be in contact with a material to be cut by the abrasive cutting tool, the element comprising a trailing protruding member extending towards the adjacent link element in a direction opposite and parallel to the drive direction of the flexible drive carrier, the trailing protruding member being formed from or coated by an abrasive compound and the trailing protruding member being configured to contact the material to contribute to cutting the material by the abrasive cutting tool; and
arranging the trailing protruding member to overlap a top surface of the adjacent link element in a plane perpendicular to the drive direction at least when the flexible drive carrier has a straight configuration and cover a portion of a width of a gap formed between the link element and the adjacent link element when the flexible drive carrier moves through a bend in an arcuate form.

17. The method according to claim 16, wherein the abrasive compound comprises a metal-based or resin-based abrasive matrix.

18. The method according to claim 17, wherein the abrasive compound is fixed or included into the element by any of: galvanic deposition, vacuum brazing or a sintering method, or where abrasive grit is mechanically fixed by insertion into the element.

\* \* \* \* \*